(12) United States Patent
Kennedy et al.

(10) Patent No.: US 9,454,683 B2
(45) Date of Patent: *Sep. 27, 2016

(54) ULTRA WIDEBAND RADIO FREQUENCY IDENTIFICATION SYSTEM, METHOD, AND APPARATUS

(71) Applicant: LIGHTWAVES SYSTEMS, INC., Cedar Rapids, IA (US)

(72) Inventors: Philip T. Kennedy, Cedar Rapids, IA (US); Joseph A. Gerke, Cedar Rapids, IA (US); David M. Snyder, Cedar Rapids, IA (US); Leslie D. Baych, Robins, IA (US); Bruce D. Melick, Cedar Rapids, IA (US)

(73) Assignee: Lightwaves Systems, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/284,557

(22) Filed: May 22, 2014

(65) Prior Publication Data

US 2014/0253291 A1 Sep. 11, 2014

Related U.S. Application Data

(63) Continuation of application No. 11/740,731, filed on Apr. 26, 2007, now Pat. No. 8,766,773, which is a continuation-in-part of application No. 11/622,824, filed on Jan. 12, 2007, now Pat. No. 7,340,283, and a (Continued)

(51) Int. Cl.
*H04W 99/00* (2009.01)
*G06K 7/10* (2006.01)

(52) U.S. Cl.
CPC .......... *G06K 7/10306* (2013.01); *H04W 99/00* (2013.01)

(58) Field of Classification Search
CPC .................. H04W 99/00; G06K 7/10306
USPC .................. 340/10.1, 10.4, 10.41, 572.1
See application file for complete search history.

(56) References Cited

U.S. PATENT DOCUMENTS

| | | |
|---|---|---|
| 3,836,951 A | 9/1974 | Geren et al. |
| 3,903,371 A | 9/1975 | Colton et al. |
| 3,906,484 A | 9/1975 | Melvin, Jr. et al. |

(Continued)

FOREIGN PATENT DOCUMENTS

| | | |
|---|---|---|
| WO | 9708545 | 3/1997 |
| WO | 0041383 | 7/2000 |

(Continued)

OTHER PUBLICATIONS

Maney, "Pulsing with Promise", USA Today May 13, 1999.

(Continued)

*Primary Examiner* — Edwin Holloway, III
(74) *Attorney, Agent, or Firm* — McKee, Voorhees & Sease, PLC

(57) ABSTRACT

A method associated with a UWB RFID system provides for receiving a data transmission transmitted using UWB and accessing data within the data transmission using a communications protocol. An initial portion of the data transmission defines a structure of the data transmission such that subsequent data in the data transmission is directly accessible without additional decoding.

11 Claims, 4 Drawing Sheets

Related U.S. Application Data continuation-in-part of application No. 10/427,039, filed on Apr. 30, 2003, now Pat. No. 7,376,191, and a continuation-in-part of application No. 10/967,850, filed on Oct. 18, 2004, now Pat. No. 7,986,729, and a continuation-in-part of application No. 11/118,928, filed on Apr. 29, 2005, now Pat. No. 8,270,452, and a continuation-in-part of application No. 11/170,489, filed on Jun. 29, 2005, now Pat. No. 7,983,146, and a continuation-in-part of application No. 11/318,283, filed on Dec. 23, 2005, now Pat. No. 8,085,813, and a continuation-in-part of application No. 09/812,545, filed on Mar. 20, 2001, now Pat. No. 7,561,808, and a continuation-in-part of application No. 10/967,859, filed on Oct. 18, 2004, now Pat. No. 7,881,619, and a continuation-in-part of application No. 10/963,034, filed on Oct. 11, 2004, now Pat. No. 7,376,357, and a continuation-in-part of application No. 10/345,766, filed on Jan. 16, 2003, now Pat. No. 8,165,146, and a continuation-in-part of application No. 10/413,801, filed on Apr. 15, 2003, now Pat. No. 7,571,211, and a continuation of application No. 11/677,408, filed on Feb. 21, 2007, now Pat. No. 7,983,349.

(60) Provisional application No. 60/795,235, filed on Apr. 26, 2006.

(56) References Cited

U.S. PATENT DOCUMENTS

| | | |
|---|---|---|
| 4,357,634 A | 11/1982 | Chung |
| 4,434,323 A | 2/1984 | Levine et al. |
| 4,513,403 A | 4/1985 | Troy |
| 4,641,317 A | 2/1987 | Fullerton |
| 4,706,264 A | 11/1987 | Cung |
| 4,813,057 A | 3/1989 | Fullerton |
| 4,939,726 A | 7/1990 | Flammer et al. |
| 5,050,189 A | 9/1991 | Cox et al. |
| 5,088,032 A | 2/1992 | Bosack |
| 5,132,986 A | 7/1992 | Endo et al. |
| 5,155,857 A | 10/1992 | Kunisaki et al. |
| 5,339,421 A | 8/1994 | Housel, III |
| 5,363,108 A | 11/1994 | Fullerton |
| 5,414,455 A | 5/1995 | Hooper et al. |
| 5,425,021 A | 6/1995 | Derby et al. |
| 5,442,390 A | 8/1995 | Hooper et al. |
| 5,453,977 A | 9/1995 | Flammer, III et al. |
| 5,497,373 A | 3/1996 | Hulen et al. |
| 5,526,035 A | 6/1996 | Lappington et al. |
| 5,560,038 A | 9/1996 | Haddock |
| 5,581,706 A | 12/1996 | Jessup, Jr. et al. |
| 5,621,412 A | 4/1997 | Sharpe et al. |
| 5,666,390 A | 9/1997 | Morzano |
| 5,677,927 A | 10/1997 | Fullerton et al. |
| 5,706,495 A | 1/1998 | Chadha et al. |
| 5,737,595 A | 4/1998 | Cohen et al. |
| 5,754,849 A | 5/1998 | Dyer et al. |
| 5,758,085 A | 5/1998 | Kouoheris et al. |
| 5,818,442 A | 10/1998 | Adamson |
| 5,832,035 A | 11/1998 | Fulleron |
| 5,841,764 A | 11/1998 | Roderique et al. |
| 5,852,825 A | 12/1998 | Winslow |
| 5,925,958 A | 7/1999 | Pirc |
| 5,951,646 A | 9/1999 | Brandon |
| 5,952,956 A | 9/1999 | Fullerton |
| 5,956,729 A | 9/1999 | Goetz et al. |
| 5,974,416 A | 10/1999 | Anand et al. |
| 5,982,276 A | 11/1999 | Stewart |
| 6,026,125 A | 2/2000 | Larrick, Jr. et al. |
| 6,031,862 A | 2/2000 | Fullerton et al. |
| 6,049,806 A | 4/2000 | Crecine |
| 6,049,848 A | 4/2000 | Yates et al. |
| 6,061,057 A | 5/2000 | Knowlton et al. |
| 6,122,207 A | 9/2000 | Koshikawa et al. |
| 6,148,414 A | 11/2000 | Brown et al. |
| 6,151,602 A | 11/2000 | Hejlsberg et al. |
| 6,185,290 B1 | 2/2001 | Shaffer et al. |
| 6,195,484 B1 | 2/2001 | Brennan et al. |
| 6,236,652 B1 | 5/2001 | Preston et al. |
| 6,250,309 B1 | 6/2001 | Krichen et al. |
| 6,272,316 B1 | 8/2001 | Wiedeman et al. |
| 6,354,946 B1 | 3/2002 | Finn |
| 6,356,946 B1 | 3/2002 | Clegg et al. |
| 6,363,320 B1 | 3/2002 | Chou |
| 6,427,150 B1 | 7/2002 | Oashi et al. |
| 6,430,208 B1 | 8/2002 | Fullerton et al. |
| 6,438,140 B1 | 8/2002 | Jungers et al. |
| 6,480,100 B1 | 11/2002 | Frieden et al. |
| 6,496,104 B2 | 12/2002 | Kline |
| 6,505,032 B1 | 1/2003 | McCorkle et al. |
| 6,532,256 B2 | 3/2003 | Miller |
| 6,536,043 B1 | 3/2003 | Guedalia |
| 6,605,950 B2 | 8/2003 | Stein |
| 6,684,250 B2 | 1/2004 | Anderson et al. |
| 6,754,190 B2 | 6/2004 | Gurney et al. |
| 6,757,740 B1 | 6/2004 | Perekh et al. |
| 6,781,530 B2 | 8/2004 | Moore |
| 6,782,048 B2 | 8/2004 | Santhoff |
| 6,868,419 B1 | 3/2005 | Melick et al. |
| 7,123,843 B2 | 10/2006 | Melick et al. |
| 7,181,247 B1 | 2/2007 | Melick et al. |
| 2001/0015965 A1 | 8/2001 | Preston et al. |
| 2001/0036183 A1 | 11/2001 | Melick et al. |
| 2001/0038628 A1 | 11/2001 | Ofek et al. |
| 2001/0049740 A1 | 12/2001 | Karpoff |
| 2001/0053175 A1 | 12/2001 | Hoctor et al. |
| 2002/0003091 A1 | 1/2002 | Kojima et al. |
| 2002/0016905 A1 | 2/2002 | Kojima et al. |
| 2002/0018458 A1 | 2/2002 | Aiello et al. |
| 2002/0018514 A1 | 2/2002 | Haynes et al. |
| 2002/0030596 A1 | 3/2002 | Finn et al. |
| 2002/0059642 A1 | 5/2002 | Russ et al. |
| 2002/0075975 A1 | 6/2002 | Fugger et al. |
| 2002/0076193 A1 | 6/2002 | Melick et al. |
| 2002/0089423 A1 | 7/2002 | Przygoda, Jr. |
| 2002/0097790 A1 | 7/2002 | Dress, Jr. et al. |
| 2002/0172291 A1 | 11/2002 | Maggio et al. |
| 2002/0190786 A1 | 12/2002 | Yoon et al. |
| 2003/0076248 A1 | 4/2003 | Larson |
| 2003/0093567 A1 | 5/2003 | Lolayekar et al. |
| 2003/0095063 A1 | 5/2003 | Fullerton |
| 2003/0095609 A1 | 5/2003 | Cowie et al. |
| 2003/0162498 A1 | 8/2003 | Rofheart et al. |
| 2003/0174048 A1 | 9/2003 | McCorkle |
| 2003/0202537 A1 | 10/2003 | Rogerson et al. |
| 2004/0008729 A1 | 1/2004 | Rogerson et al. |
| 2004/0028011 A1 | 2/2004 | Gehring et al. |
| 2004/0032354 A1 | 2/2004 | Knobel et al. |
| 2004/0048574 A1 | 3/2004 | Walker et al. |
| 2004/0077306 A1 | 4/2004 | Shor et al. |
| 2004/0131130 A1 | 7/2004 | Shor et al. |
| 2004/0140928 A1 | 7/2004 | Cleghorn |
| 2004/0141561 A1 | 7/2004 | Santhoff et al. |
| 2004/0156335 A1 | 8/2004 | Brethour et al. |
| 2004/0178934 A1 | 9/2004 | Balakrishnan et al. |
| 2004/0258133 A1 | 12/2004 | Lee et al. |
| 2005/0013385 A1 | 1/2005 | Atkinson |
| 2005/0018751 A1 | 1/2005 | Roy et al. |

FOREIGN PATENT DOCUMENTS

| | | |
|---|---|---|
| WO | 0054488 | 9/2000 |
| WO | 0116587 | 3/2001 |
| WO | 0118528 | 3/2001 |
| WO | 0197477 | 12/2001 |
| WO | 03094461 | 11/2003 |

OTHER PUBLICATIONS

Win, Moe Z., et al., "Impulse Radio: How it works", IEEE Communications Letters 2(1) Jan. 31, 1998.

(56) References Cited

OTHER PUBLICATIONS

Stallings, William, Data and Computer Communications, Fifth Edition, 1997 by Prentice-Hall, Inc. Dec. 31, 1997.
Merriam-Webster's Collegiate Dictionary, Tenth Edition, Meriam-Webster, Inc., Springfield, MA, USA, p. 902 Jul. 31, 2003.
EMC Corporation, "Universal Data Tone", http://www.emc.com/about/data_tone/index.jsp [retrieved from the Internet on Oct. 23, 2000].
Ruettgers, Michael C., "Thriving in the Information Economomy", Recent Speeches and Articles, The Wired Index Event, New York City, May 13, 1999., http://www.emc.com/about/management/speeches/wired_index.jsp, [retrieved from the Internet Oct. 23, 2000].
Pulse~Link, "Ultra Wideband Over Cable Technologies: Enhancing Cable Technologies: Enhancing Cable Television Bandwidth Capacity Without Modification to Existing Infrastructure", 2002 Pulse~LINK, Inc. Dec. 31, 2002.
Clede, Bill, "The concept of CDPD makes sense", http://www.clede.com/Articles/Police/cdpd.htm Feb. 28, 1995.
Lougheed et al., Internet RFC/STD/FYI/BCP Archines, A Border Gateway Protocol (BGP), http://www.faqs.org/rfcs/rfc1163.html Jun. 30, 1990.
Xun Su's Little Similator for Dijkstra's Algorithm, Copyright (c) Xun Su 1998, adapted from original code by Carla Laffra, 1996, http://www.ece.utexas.edu/~xsu/shortest.htm Dec. 31, 1998.
Tech/Encyclopedia, "TCP/IP abc's", http://www.techweb.com/encyclopedia/defineterm?term=TCP/IP%20abc's, [retrieved from the Internet on Feb. 24, 2000].
Joel Conover, Slicing Through IP Switching, Network Computing, Issue: 905 Mar. 15, 1998.
Socolofsky et al., Network Working Group, "A TCP/IP Tutorial", ftp://ftp.rfc-editor.org/in-notes/rfc1180.txt, Jan. 31, 1991.
Orubeondo, Ana, Mobile IP will fuel mobile computing boom, CNN.com technology, http://www.cnn.com/2000/TECH/computing/03/01/mobile.ip.idg/index.html. [retrieved from the Internet on Mar. 2, 2000].
Postel, Jon, Editor, Sep. 1981, Internet Protocol, Darpa Internet Program, prepared for Defense Advanced Research Projects Agency by Information Sciences Institute, http://194.52.182.96/rfc/rfc791.html [retrieved from the Internet on Feb. 24, 2000].
Win, Moe Z., et al., "Ultra-Wide Bandwidth Signal Propagation for Indoor Wireless Communications", IEEE International Conference on Communications—Montreal, Canada, Jun. 1997.
Ruettgers, Michael C., "E-Infostructure: EMC's Vision for Accelerating the New Economy", Recent Speeches & Articles, http://www.emc.com/about/management/speeches/cebit.jsp, [retrieved from the Internet on Dec. 12, 2000].
Dodd, Anabel Z, "The Essential Guide to Telecommunications, 2nd Edition," 2000, Prentice Hall PTR, pp. 14-17 and 188-239 Dec. 31, 2000.
Tisdal, Joachim, "GSM Cellular Radio Telephony," May, 1997, John Wiley & Sons, Inc., pp. 43-98 May 30, 1997.
Negroponte, Nicholas, "Being Digital," 1995, Vintage Books, pp. 11-85 and 127-136 Dec. 31, 2005.
Schneiderman, Ron, "Future Talk, The Changing Wireless Game," 1997, IEEE Press Marketing, pp. 89-130 and 135-141 Dec. 31, 1997.
"Video Compression: A Codec Primer," http://hotwired.lycos.com/webmonkey/97/34/index1a_page5.html?tw=multimedia Oct. 17, 2006.
Jones, Douglas W., "BCD Arithmetic, a tutorial," http://www.cs.uiowa.edu/~jones/bcd/bcd.html Dec. 31, 2002.
The Unicode Standard: A Technical Introduction, http://www.unicode.org/unicode/standard/principles.html Oct. 3, 2012.
Kuhn, Kelin J., "CD/ROM an extension of the CD audio standard," http://www.ee.washington.edu/conselec/CE/kuhn/cdrom/95x8.htm [retrieved from Internet on Apr. 3, 2001].
Kuhn, Kelin J., "Other disk formats of interest," http://www.ee.washington.edu/conselec/CE/kuhn/otherformats/95x9.htm [retrieved from Internet on Apr. 3, 2001].
"Data Transmission," http://www.cs.ucf.edu/courses/cda3102/chapter4.html [retrieved from Internet on Apr. 3, 2001].
"Data Representation," http://home.olemiss.edu/~misbook/hm1.htm [retrieved from Internet on Apr. 3, 2001].
"Data Transmission—Communications-Data Transmission," http://home.olemiss.edu/~misbook/cm6.htm [retrieved from Internet on Apr. 3, 2001].
Article entitled "ASCII Chart", http://www.jimprice.com/jim-asc.htm; pp. 1-9 Feb. 10, 2000.
rticle entitled "A Brief History of Character Codes in North America, Europe, and East Asia," http://tronweb.super-nova.co.jp/characcodehist.html; pp. 1-22. Feb. 10, 2000.
Article entitled "What is Unicode?" http://www.unicode.org/unicode/standard/WhatIsUnicode.html; pp. 1-2 Feb. 10, 2000.
Shoemake, Matthew B. "MultiBand OFDM Update and Overview" WiQuest Communications, Inc., MBOA, 21Slides Jan. 24, 2005.
"Ultrawideband: High-speed, short-range technology with far-reaching effects" MBOA-SIG White Paper, 17 pages. Sep. 1, 2004.
Batra, Anuj et al., "Multiband OFDM: Why it Wins for UWB" CommsDesign http://www.commsdesign.com/printableArticle/; jessionid=QDGDITH, 7 pages Jun. 24, 2003.
"MultiBand OFDM Physical Layer Proposal for IEEE 802.15 Task Group 3a" MBOA-SIG, info@multibandofdm.org Sep. 14, 2004.

ULTRA WIDEBAND RADIO FREQUENCY IDENTIFICATION SYSTEM, METHOD, AND APPARATUS

CROSS-REFERENCE TO RELATED APPLICATIONS

This application is a Continuation Application of U.S. Ser. No. 11/740,731 filed Apr. 26, 2007, which claims priority to U.S. Provisional Patent Application Ser. No. 60/795,235, entitled Ultra Wideband Radio Frequency Identification System, Method, and Apparatus, filed on Apr. 26, 2006.

U.S. Ser. No. 11/740,731 filed Apr. 26, 2007 is also a continuation-in-part of and claims priority to U.S. patent application Ser. No. 11/622,824, entitled Globally Referenced Positioning in a Shielded Environment, filed on Jan. 12, 2007, now U.S. Pat. No. 7,340,283 issued on Mar. 4, 2008.

U.S. Ser. No. 11/740,731 filed Apr. 26, 2007 is also a continuation-in-part of and claims priority to U.S. patent application Ser. No. 10/427,039, entitled High Bandwidth Data Transport System, filed on Apr. 30, 2003, now U.S. Pat. No. 7,376,191 issued on May 20, 2008.

U.S. Ser. No. 11/740,731 filed Apr. 26, 2007 is also a continuation-in-part of U.S. patent application Ser. No. 10/967,850, entitled Improved High Bandwidth Data Transport System, filed on Oct. 18, 2004, now U.S. Pat. No. 7,986,729 issued Jul. 26, 2011.

U.S. Ser. No. 11/740,731 filed Apr. 26, 2007 is also a continuation-in-part of U.S. patent application Ser. No. 11/118,928, entitled Method and Apparatus for Multi-Band UWB Communications, filed on Apr. 29, 2005, now U.S. Pat. No. 8,270,452 issued on Sep. 18, 2012.

U.S. Ser. No. 11/740,731 filed Apr. 26, 2007 is also a continuation-in-part of U.S. patent application Ser. No. 11/170,489, entitled Transmitting Data Including a Structured Linear Database, filed on Jun. 29, 2005, now U.S. Pat. No. 7,983,146 issued on Jul. 19, 2011.

U.S. Ser. No. 11/740,731 filed Apr. 26, 2007 is also a continuation-in-part of U.S. patent application Ser. No. 11/318,283, entitled Method for Routing Data Packets, filed on Dec. 23, 2005, now U.S. Pat. No. 8,085,813 issued on Dec. 27, 2011.

U.S. Ser. No. 11/740,731 filed Apr. 26, 2007 is also a continuation-in-part of U.S. patent application Ser. No. 09/812,545, entitled System and Method of Using Variable Pulses for Symbology, filed on Mar. 20, 2001, now U.S. Pat. No. 7,561,808 issued on Jul. 14, 2009.

U.S. Ser. No. 11/740,731 filed Apr. 26, 2007 is also a continuation-in-part of U.S. patent application Ser. No. 10/967,859, entitled System and Method of Using Variable Pulses for Symbology, filed on Oct. 18, 2004, now U.S. Pat. No. 7,881,619 issued on Feb. 1, 2011.

U.S. Ser. No. 11/740,731 filed Apr. 26, 2007 is also a continuation-in-part of U.S. patent application Ser. No. 10/963,034, entitled System and Method of Using Variable Pulses for Symbology, filed on Oct. 11, 2004, now U.S. Pat. No. 7,376,357 issued on May 20, 2008.

U.S. Ser. No. 11/740,731 filed Apr. 26, 2007 is also a continuation-in-part of U.S. patent application Ser. No. 10/345,766, entitled System and Method for Storing/Caching, Searching and Accessing Data, filed on Jan. 16, 2003, now U.S. Pat. No. 8,165,146 issued on Apr. 24, 2012.

U.S. Ser. No. 11/740,731 filed Apr. 26, 2007 is also a continuation-in-part of U.S. patent application Ser. No. 10/413,801, entitled Unified Messaging System, filed on Apr. 15, 2003, now U.S. Pat. No. 7,571,211 issued on Aug. 4, 2009.

U.S. Ser. No. 11/740,731 filed Apr. 26, 2007 is also a continuation-in-part of U.S. patent application Ser. No. 11/677,408, entitled Improved High Bandwidth Data Transport System, filed Feb. 21, 2007, now U.S. Pat. No. 7,983,349 issued Jul. 19, 2011.

All the above-identified patent applications are herein incorporated by reference in its entirety.

FIELD OF THE INVENTION

The present invention relates generally to the formatting of data as a structured linear database for use in an ultra wideband pulse-based radio frequency identification (UWB RFID) system.

PROBLEMS IN THE ART

Radio frequency identification (RFID) tags are in the news daily. RFID tags are often described as intelligent bar codes, which are electronic and can talk to a networked system to track products in a grocery store, pallets in a warehouse, factory, or on a truck. RFID tags are used as toll tags, and are the brains in smart credit cards. Soon, RFID tags will have a unique number that will identify not only the product code, but each individual product that is sold worldwide. Current RFID tags that use standard wave-oriented communication technologies have many limitations. Either, they are extremely limited in their read-write operating range (typically less than 30 ft), or when designed with an extended operating range (several hundred feet) they are prohibitively expensive for widespread use on individual items of small value. Also, RFID tags built on standard wave-oriented communication technologies are limited by multi-path signal cancellation, anti-collision algorithms, and battery life issues.

There are many applications for radio frequency identification (RFID) within the supply chain operations of today's companies. Most of these applications require item management information for tracking goods from the component level, through manufacturing and on throughout the supply chain.

With today's market attitude of "I want it now" or "I need it now", the demand for improved supply chain visibility as well as the pressure to keep costs down is driving the need for a combination of bar code and RFID system in today's businesses.

Following is a general example of how RFID could provide full visibility through a company's supply chain:

An RFID tag is embedded in a component item. The item tag can then be read and written to during the manufacturing process in order to gather and exchange Work-in-Process (WIP) data. That same tag could then be read or written to by shipping personnel at the manufacturer's shipping dock to release the original manufacturer's item from their inventory. Shipping information could then be written to the item tag by the transportation carrier as its transported from the manufacturing plant. That item is now be on its way to the end user, the next add on manufacturing site, or distribution center with complete item, source, process, and ultimate destination information included. Upon arrival at any of these locations the item tracking information could be read automatically with a fixed or portable RFID interrogator.

Finally, that same individual component tag could be read and written to at the retail store level, providing the retailer with additional pricing, receipt date, inventory, and theft prevention information.

The following list includes many typical applications where RFID solutions are being used today:

Logistics: Item Management for Manufacturing
- Raw materials
- Work-in-Process (WIP) tracking
- Bulk containers
- Pallets/boxes
- Totes
- Finished Goods Retail: Item Management Plus EAS/POS
- Embedded price tags and labels
- Track items from dock door to counter
- Smart electronic article surveillance (EAS)
- Automatic inventory control
- Transportation Management
- Access control Industrial: Warehouse Shipping/Receiving Validation
- Automates both shipping and receiving
- Dock management
- Floor inventory control
- Sorting
- Picking and special handling Other:
- Electronic toll collection
- Parking collection
- Traffic management To date, RFID products for these, and other applications, are based on wave-oriented communications, which are fundamentally limited by the physics of continuously oscillating radio frequency technology. Wave-oriented RFID products can be used to store data in a structured or partitioned manner, identify tagged objects, persons, or animals, and can be generally located using the wave-oriented communication signals.

During the last several decades, research in the wireless communications and radar industries working on applications for the military and convert communications migrated to a much different wireless technology utilizing very short pulses that individually cover very large spans of frequency. This technology research resulted in a wireless technology now known as Ultra Wideband (UWB). This technology represents the fastest of the known wireless signal processing technologies.

Some of the advantage of UWB RFID systems include, but are not limited to:
- Long battery life
- Extremely accurate positioning
- Extremely long read ranges
- Works well in multi-path environments
- Larger amounts of data stored on the tag can be transmitted
- Larger number of tags can operate and co-exist in a smaller area
- Low probability of detection
- Secure Currently, there are RFID-like products available from companies like Ubisense and Multispectral Solutions Inc, which are based on UWB. To date, these, and other products, are used only for identity and accurate locations of tagged items, persons, or animals. However, current UWB RFID products aren't used to store data in a structured or partitioned manner like their wave-oriented RFID counterparts.

Therefore, what is needed is a cost-effective solution that provides UWB RFID products that can be used to store data in a structured or partitioned manner, identify tagged objects, persons, or animals, and can be accurately located using the UWB communication signals, which overcomes these problems, and other limitations of current technology.

FEATURES OF THE INVENTION

A general feature of the present invention is the provision of a UWB RFID system, method, and apparatus which overcomes the problems in the prior art.

A feature of the present invention is the provision of a UWB RFID system that provides UWB tags with long battery life.

A feature of the present invention is the provision of a UWB RFID system that provides UWB tags that are capable of being extremely accurately positioned.

A feature of the present invention is the provision of a UWB RFID system that provides UWB tags that are capable of being read at extremely long ranges.

A feature of the present invention is the provision of a UWB RFID system that provides UWB tags that are capable of working well in multi-path environments.

A feature of the present invention is the provision of a UWB RFID system that provides UWB tags that are capable of larger amounts of structured, or partitioned, data being stored on the tag.

A feature of the present invention is the provision of a UWB RFID system that provides for a larger number of UWB tags can operate and co-exist in a smaller area.

A feature of the present invention is the provision of a UWB RFID system that provides UWB tags that have low probability of detection and interception signals.

A feature of the present invention is the provision of a UWB RFID system that provides UWB tags that are capable of secure communications.

A feature of the present invention is the provision of a UWB RFID system that can be used for logistics.

A feature of the present invention is the provision of a UWB RFID system that can be used for item management for manufacturing and tracking.

A feature of the present invention is the provision of a UWB RFID system that can be used for item management and tracking of raw materials.

A feature of the present invention is the provision of a UWB RFID system that can be used for item management and tracking of Work-in-Process (WIP) tracking.

A feature of the present invention is the provision of a UWB RFID system that can be used for item management and tracking of bulk containers.

A feature of the present invention is the provision of a UWB RFID system that can be used for item management and tracking of pallets and boxes.

A feature of the present invention is the provision of a UWB RFID system that can be used for item management and tracking of totes.

A feature of the present invention is the provision of a UWB RFID system that can be used for item management and tracking of finished goods.

A feature of the present invention is the provision of a UWB RFID system that can be used for item management, tracking, and electronic article surveillance in retail.

A feature of the present invention is the provision of a UWB RFID system that can be used for item management, tracking, and electronic article surveillance in retail to support the embedding pricing and label information in the UWB RFID tags.

A feature of the present invention is the provision of a UWB RFID system that can be used for item management, tracking, and electronic article surveillance in retail to support the tracking of tagged items from dock door to counter.

A feature of the present invention is the provision of a UWB RFID system that can be used for item management, tracking, and electronic article surveillance in retail to support automatic inventory control systems.

A feature of the present invention is the provision of a UWB RFID system that can be used for item management, tracking, and electronic article surveillance in retail to support transportation management systems.

A feature of the present invention is the provision of a UWB RFID system that can be used for electronic toll collection.

A feature of the present invention is the provision of a UWB RFID system that can be used for parking collection.

A feature of the present invention is the provision of a UWB RFID system that can be used for traffic management systems.

A feature of the present invention is the provision of a UWB RFID system that can be used for access control.

A feature of the present invention is the provision of a UWB RFID system that can be used for industrial and warehouse shipping and receiving validation.

A feature of the present invention is the provision of a UWB RFID system that can be used in industrial and warehouse applications to automate shipping and receiving.

A feature of the present invention is the provision of a UWB RFID system that can be used in industrial and warehouse applications for dock management.

A feature of the present invention is the provision of a UWB RFID system that can be used in industrial and warehouse applications for floor inventory control.

A feature of the present invention is the provision of a UWB RFID system that can be used in industrial and warehouse applications for sorting.

A feature of the present invention is the provision of a UWB RFID system that can be used in industrial and warehouse applications for picking and special handling.

A feature of the present invention is the provision of a UWB RFID system that uses active UWB tags.

A feature of the present invention is the provision of a UWB RFID system that includes address ability.

A feature of the present invention is the provision of a UWB RFID system that operates using an air interface protocol A feature of the present invention is the provision of a UWB RFID system that uses battery-assisted UWB tags or semi-passive UWB tags.

A feature of the present invention is the provision of a UWB RFID system that uses checksums.

A feature of the present invention is the provision of a UWB RFID system is used in closed-loop systems.

A feature of the present invention is the provision of a UWB RFID system that supports UWB tag commissioning.

A feature of the present invention is the provision of a UWB RFID system that includes concentrators.

A feature of the present invention is the provision of a UWB RFID system that provides UWB tags for use as contactless smart cards.

A feature of the present invention is the provision of a UWB RFID system that supports cyclic redundancy check (CRC).

A feature of the present invention is the provision of a UWB RFID system that supports UWB tag data fields.

A feature of the present invention is the provision of a UWB RFID system that supports duplex communications.

A feature of the present invention is the provision of a UWB RFID system that supports half-duplex communications.

A feature of the present invention is the provision of a UWB RFID system that meets duty cycle regulations with greater performance than wave-oriented RFID systems.

A feature of the present invention is the provision of a UWB RFID system that supports EEPROM (Electrically Erasable Programmable Read-Only Memory) on the UWB tags.

A feature of the present invention is the provision of a UWB RFID system that meets effective isotropic radiated power (EIRP) regulations with far greater performance than wave-oriented RFID systems.

A feature of the present invention is the provision of a UWB RFID system that meets effective radiated power (ERP) regulations for reader antennas while providing far greater performance than wave-oriented RFID systems.

A feature of the present invention is the provision of a UWB RFID system that overcomes sources of electromagnetic interference (EMI) while providing far greater performance than wave-oriented RFID systems.

A feature of the present invention is the provision of a UWB RFID system that can be used for electronic article surveillance (EAS).

A feature of the present invention is the provision of a UWB RFID system that uses Electronic Product Codes: (EPC).

A feature of the present invention is the provision of a UWB RFID system that uses EPC Discovery Service.

A feature of the present invention is the provision of a UWB RFID system that uses EPCglobal standards adapted for use with UWB.

A feature of the present invention is the provision of a UWB RFID system that uses EPC Information Service.

A feature of the present invention is the provision of a UWB RFID system that uses EPCglobal Network standards, which includes the Object Name Service, distributed middleware (sometimes called Savants), the EPC Information Service and Physical Markup Language.

A feature of the present invention is the provision of a UWB RFID system that supports error correcting code on UWB tags.

A feature of the present invention is the provision of a UWB RFID system that uses error correcting mode between UWB tags and reader.

A feature of the present invention is the provision of a UWB RFID system that supports use of error correcting protocols.

A feature of the present invention is the provision of a UWB RFID system that supports the use of the European Article Numbering (EAN).

A feature of the present invention is the provision of a UWB RFID system that provides readers that are capable of exciting passive UWB tags.

A feature of the present invention is the provision of a UWB RFID system that supports the use of eXtensible markup language (XML).

A feature of the present invention is the provision of a UWB RFID system that supports the use of factory programming for UWB tag identification number being written into the tags silicon microchip at the time the chip is made.

A feature of the present invention is the provision of a UWB RFID system that supports the use of UWB tags in far-field communication.

A feature of the present invention is the provision of a UWB RFID system that supports the use of UWB tags that can be field programmed.

A feature of the present invention is the provision of a UWB RFID system that supports use of the GTAG (Global Tag) standard.

A feature of the present invention is the provision of a UWB RFID system that supports use of passive UWB tags harvesting energy.

A feature of the present invention is the provision of a UWB RFID system that supports use of inlays.

A feature of the present invention is the provision of a UWB RFID system that supports use of UWB tags used as license plates.

A feature of the present invention is the provision of a UWB RFID system that supports use of UWB tag memory.

A feature of the present invention is the provision of a UWB RFID system that supports use of UWB tag memory blocks, which may or not be divided, structured, or partitioned into sections, which can be read or written to individually.

A feature of the present invention is the provision of a UWB RFID system that supports use of one or more UWB tag memory blocks that can be locked so data can't be overwritten.

A feature of the present invention is the provision of a UWB RFID system that supports use of a multiplexer that allows a UWB reader to have more than one antenna.

A feature of the present invention is the provision of a UWB RFID system that supports use of UWB tags for near-field communications.

A feature of the present invention is the provision of a UWB RFID system that overcomes noise in such a manner to provide greater range, and greater number of UWB tags that can operate in the same space, A feature of the present invention is the provision of a UWB RFID system that uses Object Name Service (ONS).

A feature of the present invention is the provision of a UWB RFID system that uses one-time programmable UWB tags.

A feature of the present invention is the provision of a UWB RFID system that uses passive UWB tags.

A feature of the present invention is the provision of a UWB RFID system that uses Physical Markup Language (PML).

A feature of the present invention is the provision of a UWB RFID system that uses a PML Server.

A feature of the present invention is the provision of a UWB RFID system that uses UWB tags as proximity sensors.

A feature of the present invention is the provision of a UWB RFID system that uses UWB read-only tags that contain data that cannot be changed unless the microchip is reprogrammed electronically.

A feature of the present invention is the provision of a UWB RFID system that uses reader talks first protocols.

A feature of the present invention is the provision of a UWB RFID system that uses read-write UWB tags.

A feature of the present invention is the provision of a UWB RFID system that uses UWB tags, which are microchips attached to an antenna that is packaged in a way that it can be applied to an object.

A feature of the present invention is the provision of a UWB RFID system that uses electronic devices that can send and receive a radio pulse known as a scanner, reader, or interrogator.

A feature of the present invention is the provision of a UWB RFID system that can interface with existing, future, savants, which is middleware for filtering data from EPC compliant readers and pass it on to enterprise systems.

A feature of the present invention is the provision of a UWB RFID system that uses semi-passive UWB tags.

A feature of the present invention is the provision of a UWB RFID system that uses UWB tags as sensors.

A feature of the present invention is the provision of a UWB RFID system that is used in silent commerce.

A feature of the present invention is the provision of a UWB RFID system that uses singulation, which is a means by which an RFID reader identifies a UWB tag with a specific serial number from a number of tags in its field.

A feature of the present invention is the provision of a UWB RFID system that uses UWB tags as smart labels.

A feature of the present invention is the provision of a UWB RFID system that uses UWB tags as smart cards.

A feature of the present invention is the provision of a UWB RFID system that uses tag talks first protocols.

A feature of the present invention is the provision of a UWB RFID system that uses TDMA, FDMA, CDMA, etc. to solve the problem of the signals of two readers colliding.

A feature of the present invention is the provision of a UWB RFID system that uses scanners or UWB tags configured as transceivers.

A feature of the present invention is the provision of a UWB RFID system that uses scanners or UWB tags configured as transponders.

A feature of the present invention is the provision of a UWB RFID system that supports the use of Unique Identifiers (UID).

A feature of the present invention is the provision of a UWB RFID system that supports the use of Universal Product Codes (UPC).

A feature of the present invention is the provision of a UWB RFID system that supports the use of UWB tags capable of WORM (Write once, read many).

A feature of the present invention is the provision of a UWB RFID system that supports the use of XML Query Language (XQL).

A feature of the present invention is the provision of UWB tags and readers that are capable of dealing with structured, or partitioned, data.

This, as well as other features and advantages of the present invention, will become apparent from the following specification and claims.

GLOSSARY OF RFID AND AUTOMATIC IDENTIFICATION INDUSTRY TERMS

Even though this glossary describes terms for wave-oriented RFID systems, many of the terms will be interchangeable with UWB RFID systems described in the present invention. The glossary serves as an excellent resource for differentiating wave-based RFID from the pulse-based UWB RFID system described in the present invention.

Active tag: An RFID tag that has a transmitter to send back information, rather than reflecting back a signal from the reader, as a passive tag does. Most active tags use a battery to transmit a signal to a reader. However, some tags can gather energy from other sources. Active tags can be read from 300 feet (100 meters) or more, but they're expensive (typically more than US$20 each). They're used for tracking expensive items over long ranges. For instance, the U.S. military uses active tags to track containers of supplies arriving in ports.

Addressability: The ability to write data to different fields, or blocks of memory, in the microchip in an RFID transponder.

Agile reader: A generic term that usual refers to an RFID reader that can read tags operating at different frequencies or using different methods of communication between the tags and readers.

Air interface protocol: The rules that govern how tags and readers communicate.

Alignment: See Orientation.

Amplitude: The maximum absolute value of a periodic curve measured along its vertical axis (the height of a wave, in layman's terms).

Amplitude modulation: Changing the amplitude of a radio wave. A higher wave is interpreted as a 1 and a normal wave is interpreted as a zero. By changing the wave, the RFID tag can communicate a string of binary digits to the reader. Computers can interpret these digits as digital information. The method of changing the amplitude is known as amplitude shift keying, or ASK.

Antenna: The tag antenna is the conductive element that enables the tag to send and receive data. Passive, low- (135 kHz) and high-frequency (13.56 MHz) tags usually have a coiled antenna that couples with the coiled antenna of the reader to form a magnetic field. UHF tag antennas can be a variety of shapes. Readers also have antennas which are used to emit radio waves. The RF energy from the reader antenna is "harvested" by the antenna and used to power up the microchip, which then changes the electrical load on the antenna to reflect back its own signals.

Antenna gain: In technical terms, the gain is the ratio of the power required at the input of a loss-free reference antenna to the power supplied to the input of the given antenna to produce, in a given direction, the same field strength at the same distance. Antenna gain is usually expressed in decibels and the higher the gain the more powerful the energy output. Antennas with higher gain will be able to read tags from farther away.

Anti-collision: A general term used to cover methods of preventing radio waves from one device from interfering with radio waves from another. Anti-collision algorithms are also used to read more than one tag in the same reader's field.

Auto-ID Center: A non-profit collaboration between private companies and academia that pioneered the development of an Internet-like infrastructure for tracking goods globally through the use of RFID tags.

Automatic Identification: A broad term that covers methods of collecting data and entering it directly into computer systems without human involvement. Technologies normally considered part of auto-ID include bar codes, biometrics, RFID and voice recognition.

Battery-assisted tag: These are RFID tags with batteries, but they communicate using the same backscatter technique as passive tags (tags with no battery). They use the battery to run the circuitry on the microchip and sometimes an onboard sensor. They have a longer read range than a regular passive tag because all of the energy gathered from the reader can be reflected back to the reader. They are sometimes called "semi-passive RFID tags."

Carrier frequency: The main frequency of a transmitter, or RFID reader, such as 915 MHz. The frequency is then changed, or modulated, to transmit information.

Checksum: A code added to the contents of a block of data stored on an RFID microchip that can be checked before and after data is transmitted from the tag to the reader to determine whether the data has been corrupted or lost. The cyclic redundancy check is one form of checksum.

Chipless RFID tag: An RFID tag that doesn't depend on a silicon microchip. Some chipless tags use plastic or conductive polymers instead of silicon-based microchips. Other chipless tags use materials that reflect back a portion of the radio waves beamed at them. A computer takes a snapshot of the waves beamed back and uses it like a fingerprint to identify the object with the tag. Companies are experimenting with embedding RF reflecting fibers in paper to prevent unauthorized photocopying of certain documents. Chipless tags that use embedded fibers have one drawback for supply chain uses—only one tag can be read at a time.

Circular-polarized antenna: A UHF reader antenna that emits radio waves in a circular pattern. These antennas are used in situations where the orientation of the tag to the reader cannot be controlled. Since the waves are moving in a circular pattern, they have a better chance of hitting the antenna, but circular-polarized antennas have a shorter read range than linear-polarized antennas.

Closed-loop systems: RFID tracking systems set up within a company. Since the tracked item never leaves the company's control, it does not need to worry about using technology based on open standards.

Commissioning a tag: This term is sometime used to refer to the process of writing a serial number to a tag (or programming a tag) and associating that number with the product it is put on in a database.

Concentrator: A device connected to several RFID readers to gather data from the readers. The concentrator usually performs some filtering and then passes only useful information from the readers on to a host computer.

Contactless smart card: An awkward name for a credit card or loyalty card that contains an RFID chip to transmit information to a reader without having to be swiped through a reader. Such cards can speed checkout, providing consumers with more convenience.

Coupling: See inductive coupling

Cyclic redundancy check (CRC): A method of checking data stored on an RFID tag to be sure that it hasn't been corrupted or some of it lost. (See Checksum.)

Data transfer rate: The number of characters that can be transferred from an RFID tag to a reader within a given time. Baud rates are also used to quantify how fast readers can read the information on the RFID tag. This differs from read rate, which refers to how many tags can be read within a given period of time.

Data field: An area of memory on an RFID microchips that is assigned to a particular type of information. Data fields may be protected (see below) or they may be written over, so a data field might contain information about where an item should be sent to. When the destination changes, the new information is written to the data field.

Data field protection: The ability to prevent data stored in a specific area of memory of an RFID microchip from being overwritten. Companies might want to protect the data field that stores an Electronic Product Code, which doesn't change during the life of the product it's associated with.

Decibel (dB): A measure of the gain of an antenna.

De-tune: UHF antennas are tuned to receive RFID waves of a certain length from a reader, just as the tuner on the radio in a car changes the antenna to receive signals of different frequencies. When UHF antenna is close to metal or metallic material, the antenna can be detuned, resulting in poor performance.

Duplex: A channel capable of transmitting data in both directions at the same time. (Half duplex is a channel capable of transmitting data in both directions, but not simultaneously.)

Duty cycle: The length of time the reader can be emitting energy. Regulations in the European Union say readers can be on only 10 percent of the time.

EEPROM (Electrically Erasable Programmable Read-Only Memory): A method of storing data on microchips. Usually bytes can be erased and reprogrammed individually. RFID tags that use EEPROM are more expensive than factory programmed tags, where the number is written into the silicon when the chip is made, but they offer more flexibility because the end user can write an ID number to the tag at the time the tag is going to be used.

Effective isotropic radiated power (EIRP): A measurement of the output of RFID reader antennas used in the United States and elsewhere. EIRP is usually expressed in watts.

Effective radiated power (ERP): A measurement of the output of RFID reader antennas used in Europe and elsewhere. ERP is usually expressed in watts and is not the same as EIRP.

Electromagnetic interference (EMI): Interference caused when the radio waves of one device distort the waves of another. Cells phones, wireless computers and even robots in factories can produce radio waves that interfere with RFID tags.

Electronic article surveillance (EAS): Simple electronic tags that can be turned on or off. When an item is purchased (or borrowed from a library), the tag is turned off. When someone passes a gate area holding an item with a tag that hasn't been turned off, an alarm sounds. EAS tags are embedded in the packaging of most pharmaceuticals. They can be RF-based, or acousto-magnetic.

Electronic Product Code: (EPC): A serial, created by the Auto-ID Center, that will complement barcodes. The EPC has digits to identify the manufacturer, product category and the individual item.

EPC Discovery Service: An EPCglobal Network service that allows companies to search for every reader that has read a particular EPC tag.

EPCglobal: A non-profit organization set up the Uniform Code Council and EAN International, the two organizations that maintain barcode standards, to commercialize EPC technology. EPCglobal is made up of chapters in different countries and regions. It is commercializing the technology originally developed by the Auto-ID Center.

EPC Information Service: Part of the EPC Network. The EPC Information Service is a network infrastructure that enables companies to store data associated with EPCs in secure databases on the Web. The EPC Information Service will enable companies to provide different levels of access to data to different groups. Some information associated with an EPC might be available to everyone. Other information might be available only to a manufacturer's retail customers. The service also includes a number of applications, such as the EPC Discovery Service.

EPCglobal Network (or EPC Network): The Internet-based technologies and services that enable companies to retrieve data associated with EPCs. The network infrastructure includes the Object Name Service, distributed middleware (sometimes called Savants), the EPC Information Service and Physical Markup Language.

Error correcting code: A code stored on an RFID tag to enable the reader to figure out the value of missing or garbled bits of data. It's needed because a reader might misinterpret some data from the tag and think a Rolex watch is actually a pair of socks.

Error correcting mode: A mode of data transmission between the tag and reader in which errors or missing data is automatically corrected.

Error correcting protocol: A set of rules used by readers to interpret data correctly from the tag.

European Article Numbering (EAN): The bar code standard used throughout Europe, Asia and South America. It is administered by EAN International.

Excite: The reader is said to "excite" a passive tag when the reader transmits RF energy to wake up the tag and enable it to transmit back.

eXtensible markup language (XML): A widely accepted way of sharing information over the Internet in a way that computers can use, regardless of their operating system.

European Telecommunications Standards Institute (ETSI): The European Union body that recommends standards for adoption by member countries.

Factory programming: Some read-only have to have their identification number written into the silicon microchip at the time the chip is made. The process of writing the number into the chip is called factory programming. This data can't be written over or changed.

Far-field communication: RFID reader antennas emit electromagnetic radiation (radio waves). If an RFID tag is outside of one full wavelength of the reader, it is said to be in the "far field." If it is within one full wavelength away, it is said to be in the "near field." The far field signal decays as the square of the distance from the antenna, while the near field signal decays as the cube of distance from the antenna. So passive RFID systems that rely on far field communications (typically UHF and microwave systems) have a longer read range than those that use near field communications (typically low- and high-frequency systems).

Field programming: Tags that use EEPROM, or non-volatile memory, can be programmed after it is shipped from the factory. That is, users can write data to the tag when it is placed on a product.

Frequency: The number of repetitions of a complete wave within one second. 1 Hz equals one complete waveform in one second. 1 KHz equals 1,000 waves in a second. RFID tags use low, high, ultra-high and microwave frequencies. Each frequency has advantages and disadvantages that make them more suitable for some applications than for others.

Frequency hopping: A technique used to prevent readers from interfering with one another. In the United States, UHF RFID readers actually operate between 902 and 928 MHz, even though it is said that they operate at 915 MHz. The readers may jump randomly or in a programmed sequence to any frequency between 902 MHz and 928 MHz. If the band is wide enough, the chances of two readers operating at exactly the same frequency is small. The UHF bands in Europe and Japan are much smaller so this technique is not effective for preventing reader interference.

Gain: See Antenna gain.

GTAG (Global Tag): A standardization initiative of the Uniform Code Council (UCC) and the European Article Numbering Association (EAN) for asset tracking and logistics based on radio frequency identification (RFID). The GTAG initiative was supported by Philips Semiconductors, Intermec, and Gemplus, three major RFID tag makers. But it was superseded by the Electronic Product Code.

Harvesting: A term sometimes used to describe the way passive tags gather energy from an RFID reader antenna.

High-frequency: From 3 MHz to 30 MHz. HF RFID tags typically operate at 13.56 MHz. They typically can be read from less than 3 feet away and transmit data faster than low-frequency tags. But they consume more power than low-frequency tags.

Inductive coupling: A method of transmitting data between tags and readers in which the antenna from the reader picks up changes in the tag's antenna. Industrial, Scientific, and Medical (ISM) bands: A group of unlicensed frequencies of the electromagnetic spectrum.

Inlay: An RFID microchip attached to an antenna and mounted on a substrate. Inlays are essentially unfinished RFID labels. They are usually sold to label converters who turn them into smart labels.

Integrated circuit (IC): A microelectronic semiconductor device comprising many interconnected transistors and other components. Most RFID tags have ICs.

Input/output (I/O): Ports on a reader. Users can connect devices, such as an electronic eye to the input port so that when an object breaks the beam of the electronic eye the reader begins reading. Devices can also be connected to an output part, so that when a tag is read, a conveyor is turned on or a dock door opened.

Interrogator: See Reader.

License plate: This term generally applies to a simple RFID that has only a serial number that is associated with information in a database. The Auto-ID Center promoted the concept as a way to simplify the tag and reduce the cost.

Linear-polarized antenna: A UHF antenna that focuses the radio energy from the reader in a narrow beam. This increases the read distance possible and provides greater penetration through dense materials. Tags designed to be used with a linear polarized reader antenna must be aligned with the reader antenna in order to be read.

Low-frequency: From 30 kHz to 300 kHz. Low-frequency tags typical operate at 125 kHz or 134 kHz. The main disadvantages of low-frequency tags are they have to be read from within three feet and the rate of data transfer is slow. But they are less subject to interference than UHF tags.

Memory: The amount of data that can be stored on the microchip in an RFID tag. Memory block: Memory on the microchip in an RFID tag is usually divided into sections, which can be read or written to individually. Some blocks might be locked, so data can't be overwritten, while others are not.

Microwave tags: A term that is some time used to refer to RFID tags that operate at 5.8 GHz. They have very high transfer rates and can be read from as far as 30 feet away, but they use a lot of power and are expensive. (Some people refer to any tag that operates above about 415 MHz as a microwave tag.)

Modulation: Changing the radio waves traveling between the reader and the transponder in ways that enable the transmission of information. Waves are changed in a variety of ways that can be picked up by the reader and turned into the ones and zeroes of binary code. Waves can be made higher or lower (amplitude modulation) or shifted forward (phase modulation). The frequency can be varied (frequency modulation), or data can be contained in the duration of pulses (pulse-width modulation).

Multiple access schemes: Methods of increasing the amount of data that can be transmitted wirelessly within the same frequency spectrum. Some RFID readers use Time Division Multiple Access, or TDMA, meaning they read tags at different times to avoid interfering with one another.

Multiplexer: An electronic device that allows a reader to have more than one antenna. Each antenna scans the field in a preset order. This reduces the number of readers needed to cover a given area, such as a dock door, and prevents the antennas from interfering with one another.

Near-field communication: RFID reader antennas emit electromagnetic radiation (radio waves). If an RFID tag is within full wavelength of the reader, it is said to be in the "near field." If it is more than the distance of one full wavelength away, it is said to be in the "far field." The near field signal decays as the cube of distance from the antenna, while the far field signal decays as the square of the distance from the antenna. So passive RFID systems that rely on near-field communication (typically low- and high-frequency systems) have a shorter read range than those that use far field communication (UHF and microwave systems).

Noise: Unwanted ambient electrical signals or electromagnetic energy found in the operating environment of RFID equipment. Noise can be caused by other RF devices, robots, electric motors and other machines.

Nominal range: The read range at which the tag can be read reliably. Null spot: Area in the reader field that doesn't receive radio waves. This is essentially the reader's blind spot. It is a phenomenon common to UHF systems.

Object Name Service (ONS): An Auto-ID Center-designed system for looking up unique Electronic Product Codes and pointing computers to information about the item associated with the code. ONS is similar to the Domain Name Service, which points computers to sites on the Internet.

One-time programmable tag: Also called a field-programmable tag. An RFID tag that can be written to once and read many times (see WORM).

Orientation: The position of a tag antenna vis-a-vis a reader antenna. With UHF systems, readers can be either circular-polarized or linear-polarized. When using a linear polarized antenna, the tag reader and antenna reader must be in alignment in order to achieve the longest reading distance. If that tag antenna is aligned vertically and the reader is sending out signals horizontally, only a small portion of the energy emitted by the reader will hit the tag antenna.

Passive tag: An RFID tag without a battery. When radio waves from the reader reach the chip's antenna, the energy is converted by the antenna into electricity that can power up the microchip in the tag. The tag is able to send back information stored on the chip. Today, simple passive tags cost from U.S. 20 cents to several dollars, depending on the amount of memory on the tag and other features.

Patch antenna: A small square reader antenna made from a solid piece of metal or foil.

Penetration: The ability of a particular radio frequency to pass through non-metallic materials. Low-frequency systems have better penetration than UHF systems.

Phantom read (also called a phantom transaction or false read): When a reader reports the presence of a tag that doesn't exist.

Physical Markup Language (PML): An Auto-ID Center-designed method of describing products in a way computers can understand. PML is based on the widely accepted eXtensible Markup Language used to share data over the Internet in a format all computers can use. The idea is to create a computer language that companies can use to describe products so that computer can search for, say, all "softdrinks" in inventory.

PML Server: A server that responds to requests for Physical Markup Language (PML) files related to individual Electronic Product Codes. The PML files and servers will be maintained by the manufacturer of the item. The name PML server has been replaced by EPC Information Service.

Power level: The amount of RF energy radiated from a reader or an active tag. The higher the power output, the longer the read range, but most governments regulate power levels to avoid interference with other devices.

Programming a tag: Writing data to an RFID tag. This is sometimes called "commissioning a tag."

Protocol: A set of rules that govern communications systems. (See Air-interface protocol.)

Proximity sensor: A device that detects the presence of an object and signals another device. Proximity sensors are often used on manufacturing lines to alert robots or routing devices on a conveyor to the presence of an object. They can be used in RFID systems to turn on readers.

Radio Frequency Identification (RFID): A method of identifying unique items using radio waves. Typically, a reader communicates with a tag, which holds digital information in a microchip. But there are chipless forms of RFID tags that use material to reflect back a portion of the radio waves beamed at them.

Range: See read range.

Read: The process of retrieving data stored on an RFID tag by sending radio waves to the tag and converting the waves the tag sends back into data.

Reader: A device used to communicate with RFID tags. The reader has one or more antennas, which emit radio waves and receive signals back from the tag. The reader is also sometimes called an interrogator because it "interrogates" the tag.

Reader (also called an interrogator): The reader communicates with the RFID tag via radio waves and passes the information in digital form to a computer system.

Reader field: The area of coverage. Tags outside the reader field do not receive radio waves and can't be read.

Read-only tags: Tags that contain data that cannot be changed unless the microchip is reprogrammed electronically.

Reader talks first: A means by which a passive UHF reader communicates with tags in its read field. The reader sends energy to the tags but the tags sit idle until the reader requests them to respond. The reader is able to find tags with specific serial numbers by asking all tags with a serial number that starts with either 1 or 0 to respond. If more than one responds, the reader might ask for all tags with a serial number that starts with 01 to respond, and then 010. This is called "walking" a binary tree, or "tree walking." (See Singulation.)

Read range: The distance from which a reader can communicate with a tag. Active tags have a longer read range than passive tags because they use a battery to transmit signals to the reader. With passive tags, the read range is influenced by frequency, reader output power, antenna design, and method of powering up the tag. Low frequency tags use inductive coupling (see above), which requires the tag to be within a few feet of the reader.

Read rate: Often used to describe the number of tags that can be read within a given period. The read rate can also mean the maximum rate at which data can be read from a tag expressed in bits or bytes per second. (See Data transfer rate.)

Read-write tag: an RFID tag that can store new information on its microchip. These tags are often used on reusable containers and other assets. When the contents of the container are changed, new information is written to the tag. Read-write tags are more expensive than read-only tags.

RFID tag: A microchip attached to an antenna that is packaged in a way that it can be applied to an object. The tag picks up signals from and sends signals to a reader. The tag contains a unique serial number, but may have other information, such as a customers' account number. Tags come in many forms, such smart labels that can have a barcode printed on it, or the tag can simply be mounted inside a carton or embedded in plastic. RFID tags can be active, passive or semi-passive.

Scanner: An electronic device that can send and receive radio waves. When combined with a digital signal processor that turns the waves into bits of information, the scanner is called a reader or interrogator.

Savants: Middleware created by the Auto-ID Center to filter data from EPC readers and pass it on to enterprise systems. It was envisioned that Savants would reside on servers across the EPC Network and pass data to one another and act as a kind of nervous system for the network. The term is being phase out by EPCglobal and many of the functions of Savants are being incorporated in commercial middleware products.

Semi-passive tag: Similar to active tags, but the battery is used to run the microchip's circuitry but not to broadcast a signal to the reader. Some semi-passive tags sleep until they are woken up by a signal from the reader, which conserves battery life. Semi-passive tags can cost a dollar or more. These tags are sometimes called battery-assisted tags.

Sensor: A device that responds to a physical stimulus and produces an electronic signal. Sensors are increasingly being combined with RFID tags to detect the presence of a stimulus at an identifiable location.

Silent Commerce: This term covers all business solutions enabled by tagging, tracking, sensing and other technologies, including RFID, which make everyday objects intelligent and interactive. When combined with continuous and pervasive Internet connectivity, they form a new infrastructure that enables companies to collect data and deliver services without human interaction.

Signal attenuation: The weakening of RF energy from an RFID tag or reader. Water absorbs UHF energy, causing signal attenuation.

Singulation: A means by which an RFID reader identifies a tag with a specific serial number from a number of tags in its field. There are different methods of singulation, but the most common is "tree walking", which involves asking all tags with a serial number that starts with either a 1 or 0 to respond. If more than one responds, the reader might ask for all tags with a serial number that starts with 01 to respond, and then 010. It keeps doing this until it finds the tag it is looking for. (See Reader talks first.)

Smart label: A generic term that usually refers to a barcode label that contains an RFID transponder. It's considered "smart" because it can store information, such as a unique serial number, and communicate with a reader.

Smart cards: See Contactless smart cards.

SAW (Surface Acoustic Wave): A technology used for automatic identification in which low power microwave radio frequency signals are converted to ultrasonic acoustic signals by a piezoelectric crystalline material in the transponder. Variations in the reflected signal can be used to provide a unique identity.

Synchronization: Timing readers or reader antennas near one another so that they don't interfere with one another.

Tag: See RFID tag

Tag talks first: A means by which a reader in a passive UHF system identifies tags in the field. When tags enter the reader's field, they immediately communicate their presence by reflecting back a signal. This is useful when you want to know everything that is passing a reader, such as when items are moving quickly on a conveyor. In other cases, the reader wants to simply find specific tags in a field, in which case it wants to broadcast a signal and have only certain tags respond. (See Reader talks first.)

Time Division Multiple Access (TDMA): A method of solving the problem of the signals of two readers colliding. Algorithms are used to make sure the readers attempt to read tags at different times.

Transceiver: A device that both transmits and receives radio waves.

Transponder: A radio transmitter-receiver that is activated when it receives a predetermined signal. RFID transponders come in many forms, including smart labels, simple tags, smart cards and keychain fobs. RFID tags are sometimes referred to as transponders.

Ultra-high frequency (UHF): From 300 MHz to 3 Ghz. Typically, RFID tags that operate between 866 MHz to 960 MHz. They can send information faster and farther than high- and low-frequency tags. But radio waves don't pass through items with high water content, such as fruit, at these frequencies. UHF tags are also more expensive than low-frequency tags, and they use more power.

Uniform Code Council (UCC): The nonprofit organization that overseas the Uniform Product Code, the barcode standard used in North America.

Unique Identifier (UID): A serial number that identifies the transponder. The U.S. Department of Defense has also developed an identification scheme called UID.

Universal Product Code (UPC): The barcode standard used in North America. It is administered by the Uniform Code Council.

WORM: Write once, read many. A tag that can be written to only once by the user. Thereafter, the tag can only be read.

Write rate: The rate at which information is transferred to a tag, written into the tag's memory and verified as being correct.

XML: See eXtensible Markup Language.

XML Query Language (XQL): A method of searching a database based on the extensible markup language (XML). Files created using the Auto-ID Center's Physical Markup Language can be searched using XQL.

BRIEF DESCRIPTION OF THE DRAWING AND CHARTS

SUMMARY OF THE INVENTION

Figure 1:
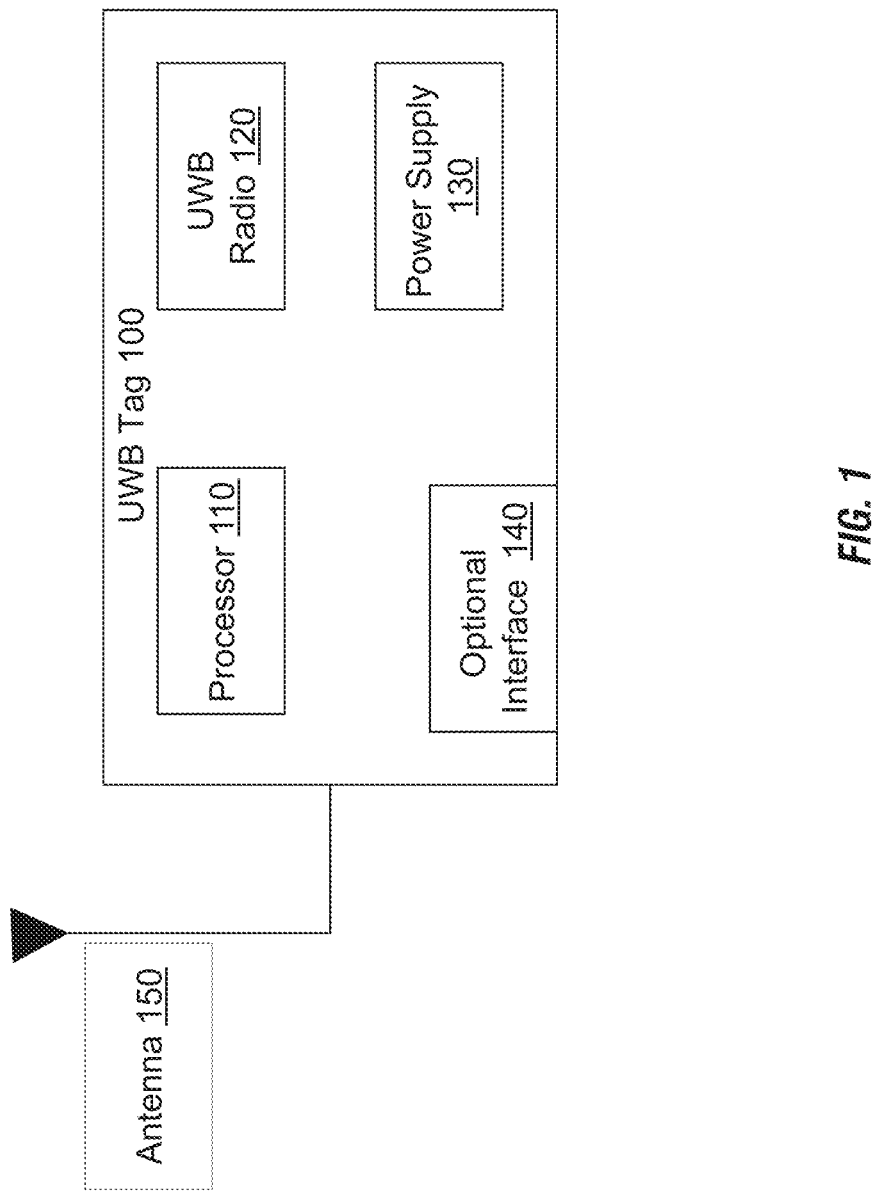
FIG. 1 is an illustration of a UWB RFID tag.

The present invention utilizes a revolutionary means for communications known as ultra wideband (UWB). UWB is a pulse-based technology that offers many advantages, including, simpler electronics which equates to lower costs, longer battery life, longer operating ranges for communication (up to 650 feet), and are multi-path signal (shadow) resistant. In addition, UWB RFID tags can be accurately located within 12".

The present invention for UWB RFID technology also includes our protocol for pulse-based communications which includes algorithms for decoding data by position, and multi-level encoding when using our Variable Pulse Encoding (VPE) technology as described in the cross-referenced and related patent applications, which were previously incorporated by reference. VPE can be used to increase the amount of data stored on the UWB tag, increasing the number of UWB tags that can operate without colliding, increasing the operating range, and increasing the data rate performance.

The present invention is a comprehensive method, based on TM-UWB, or any other UWB modulation scheme, for the secure, high speed, wireless transmission and storage of data. Other methods of UWB modulation are discussed in the cross referenced and related patent applications listed previously in the present invention, which were previously incorporated by reference. The present invention is a UWB pulse-based structured linear database which provides a common platform for simultaneous transmission of streaming and non-streaming data. This platform is designed to allow for universal data interchange between different operating systems, software applications, and electronic devices.

The present invention provides a common platform for universal data interchange, for simultaneous transmission of streaming and non-streaming data, based on time modulated ultra wideband (TM-UWB), or any other UWB modulation scheme, for transmitting and receiving coded pulses. The present invention also provides for high-speed, secure transmission of structured linear databases over a variety of networks, either wireless and/or hard-wired.

As previously discussed, TM-UWB, or any other form of UWB modulation, is a wireless technology that transmits very low power radio signals with very short pulses using very wide signal bandwidths. The pulses are transmitted at ultra precise, nearly random intervals, and frequencies to convey data using a technique called pulse position modulation. The TM-UWB, or any other form of UWB modulated pulse train, may transmit or receive as many as one billion pulses, per every second. The TM-UWB, or any other type of UWB modulated pulse train can be structured into pre-determined, recognizable partitions for containing data, such as but not limited to, 1) a routing header division; 2) LFAT (Linear File Allocation Table) division; 3) data storage and transmission division(s); and 4) a tailbit division.

A unique feature of this technology is pulses are digitally independent which allow radio, TV, voice, sensor data, RFID partitioned data, or data such as documents and spreadsheets, to be telecommunicated concurrently using a UWB pulse train.

The routing header division of the pulse train is reserved for telecommunication packet routing and protocol information, just as current telecommunication packets do. The RFID implementation of the present invention may not require the use of a routing header. These routing header subdivisions may be used by a variety of transmission control protocols, such as but not limited to, file transfer protocol, link access protocol, balanced file transfer access method, product definition interchange format, asynchronous transfer mode, the transmission control protocol/internet protocol (TCP/IP), or the geoposition based transmission control protocol described in U.S. Pat. No. 6,980,566, entitled Method for Routing Data Packets Using an IP Address Based in GEO position U.S. Pat. No. 6,980,566, to Melick, et al, previously incorporated by reference.

The LFAT division is reserved and acts as an identifier that points to particular decoding templates. These templates may be one of many standard templates, or may be proprietary. These templates may be used to decode personal information, medical information, school records, manufacturing information, sensor data, RFID partitioned data, etc., contained in the data storage and transmission division(s) of the structured linear database. The data storage and transmission division(s) may be further subdivided. The decoding templates will identify for each subdivision in the storage and transmission division(s), the field name, field length, and the start and end position of each subdivision in the linear database. It is the combination of field names related to the position of UWB pulsed data in each subdivision that allows for universal data interchange between different operating systems, software applications, and electronic devices, such as but not limited to UWB RFID scanners and tags.

The data storage and transmission division(s) of a structured linear database reserves pre-determined segments of a UWB modulated pulse train to act as a common platform for simultaneous use of any, or all, of the following: Internet, voice communication, radio transmission, HDTV and digital TV transmission, sensor data, RFID partitioned data, document or spreadsheet data, etc.

The last subdivision in a structured linear database is reserved for a tailbit which signifies the end of a telecommunication packet, just as current telecommunication packets do.

DETAILED DESCRIPTION OF THE PREFERRED EMBODIMENT(S)

A preferred embodiment of the present invention will be described as it applies to its preferred embodiment. It is not intended that the present invention be limited to the described embodiment. It is intended that the invention cover all modifications and alternatives which may be included within the spirit and scope of the invention.

A feature of the present invention is a UWB pulse-based structured linear database which provides a common platform for the transmission and receipt of RFID partitioned data. The reigning standard for wave-oriented RFID is the Electronic Product Code (EPC) standard. The following comes from an EPC document entitled The EPC Global Architecture Framework, page 11, line 296-305, "For trading partners to exchange information, they must have prior agreement as to the structure and meaning of data to be exchanged, and the mechanisms by which exchange will be carried out. EPCglobal standards include data standards and information exchange standards that form the basis of cross-enterprise exchange. Likewise, for trading partners to exchange physical objects, they must have prior agreement as to how physical objects will carry Electronic Product Codes in a mutually understandable way. EPCglobal standards include specifications for RFID devices and data standards governing the encoding of EPCs on those devices." The EPC has specifications for wave-oriented UHF RFID tags and equipment, but not UWB. The EPCglobal standards define partitioned data, but they do not define UWB pulse-based partitioned data. The present invention is a UWB pulse-based structured linear database.

As the previous paragraph about EPCglobal standards point out, "For trading partners to exchange information, they must have prior agreement as to the structure and meaning of data to be exchanged, and the mechanisms by which exchange will be carried out." The present invention provides a common platform for universal data interchange using UWB pulse-based communications to create partitioned data, or a structured linear database, which is a train of pulses divided into pre-determined, recognizable segments.

The following reference comes from the EPCglobal Specification for an RFID Air Interface, EPC Radio-Frequency Identity ProtocolsClass-1 Generation-2 UHF RFID, Protocol for Communications at 860 Mhz-960 Mhz.

P. 9—Introduction

This specification defines the physical and logical requirements for a passive-backscatter, interrogator-talks-first (ITF), radio-frequency identification (RFID) system operating in the 860 Mhz-960 Mhz frequency range. The system comprises interrogators, also known as readers, and tags, also known as labels.

An interrogator transmits information to a tag by modulating an RF signal in the 860 Mhz-960 Mhz range. The tag receives both information and operating energy from this RF signal. Tags are passive, meaning that they receive all of their operating energy from the interrogator's RF waveform.

An interrogator receives information from a tag by transmitting a continuous-wave (CW) RF signal to the tag; the tag responds by modulating the reflection coefficient of its antenna, thereby backscattering an information signal to the interrogator. The system is ITF, meaning that a tag modulates its antenna reflection coefficient with an information signal only after being directed to do so by an interrogator.

Interrogators and tags are not required to talk simultaneously; rather, communications are half-duplex, meaning that interrogators talk and tags listen, or vice versa.

P. 28—6.3.1.3.2—Data Encoding

Tags shall encode the backscattered data as either MF0 baseband or Miller modulation of a sub-carrier at the data rate. The interrogator commands the encoding choice.

P. 29—2nd Paragraph: Dummy Bit (Tailbit)

FIG. 6.9 shows generated baseband FM0 symbols and sequences. The duty cycle of a 00 or 11 sequence measured at the modulator output shall be a minimum of 45% and a maximum of 55% with a nominal value of 50%. FM0 encoding has memory; consequently, the choice of FM0 sequences in FIG. 6.9 depends on prior transmissions. FM0 signaling shall always end with a "dummy" data-1 bit at the end of a transmission as show in FIG. 6.10.—P. 30—1st paragraph . . . Miller signaling shall always end with a "dummy" data-1 bit at the end of a transmission. P. 35—6.3.2.1—tag memory.

Tag memory shall be logically separated into four distinct banks, each of which may comprise zero or more memory words. A logical memory map is shown in FIG. 6.17. The memory banks are:

a) Reserved memory shall contain the kill and access passwords.
b) EPC memory shall contain an EPC that identifies the object to which the tags is or will be attached beginning at address xx.
c) TID memory shall contain sufficient identifying information for an interrogator to uniquely identify the custom commands and/or optional features that a Tag supports.
d) User memory allows user-specific data storage.

What is clear is that EPCglobal standards define continuous wave devices, that a tailbit is used, and the tags memory is divided into banks. The present invention is a UWB pulse-based system for RFID that describes tailbits, and memory divided into banks, or partitions. This portion of the EPCglobal standard specifies the type of modulation that must be used to comply with the inter-operability standard. A UWB pulse-based signal can be physically and logically modulated on many levels simultaneously. A UWB pulse-based signal can simultaneously be modulated using pulse characteristics, such as, but not limited to time, frequency, amplitude, pulse width, and polarity. In addition, a UWB pulse-based signal can be time modulated between successive pulses to represent data. In addition, a UWB pulse-based signal can be PN coded.

FIG. 1 is a block diagram of the essential components of the UWB RFID tag of the present invention. In addition to the "standard" RFID tag form factor, UWB tag 100 can be constructed in a wide variety of form factors, such as, but not limited to, luggage tags, wristbands, anklebands, personnel badges, SDIO cards, PCMCIA cards, microprocessors, wristwatches, etc.

At a minimum, UWB tag 100 includes a processor 110, a UWB radio 120, a power supply 130, an antenna 150. Optionally, UWB tag 100 may include an optional interface 140.

The processor 110 contains RAM, and for sophisticated uses can include a computer, such as, but not limited to a PowerPC. The processor 110 integrates and controls the tags functions. UWB tag 100's main communication interface is via UWB radio 120 which is connected to antenna 150. Radio 120 is a UWB radio. The UWB radio 120 may be configured to operate under standards such as, but not limited to, 802.15.3a, 802.15.4a, MBOA, DSSS, FCC Part 15.250, etc.

The UWB tag's 100 microprocessors may be built on hardware including, but not limited to, Field Programmable Gate Arrays (FPGA), Application Specific Integrated Circuits (ASIC), System-On-A-Chip (SoC), etc.

The power supply 130 for UWB tag 100 may be solar, battery, passive type powered by RF energy radiated from a finder, or a battery assisted passive type that uses a combination of battery and RF energy.

The optional interface 140 may be a port such as, but not limited to an RJ-11 jack for telephone twisted pair, an RJ-45 jack for an Ethernet connection, IEEE 1394 Fire Wire connection, USB, RS-232, PCMCIA slot, SDIO connection, Compact Flash slot, etc. The PCMCIA slot can be used as a wireless integration point for systems such as, but not limited to, Bluetooth, 802.11a, 802.11b, 802.11g, GSM, UWB, etc.

Optionally, UWB tag 100 can include an LED to indicate that it is being communicated with. An LED is a Light-Emitting Diode, which is a small semiconductor device that emits light when charged with electricity. LEDs come in many colors, and some LEDs contain multiple elements and are therefore capable of multiple colors.

Figure 2:
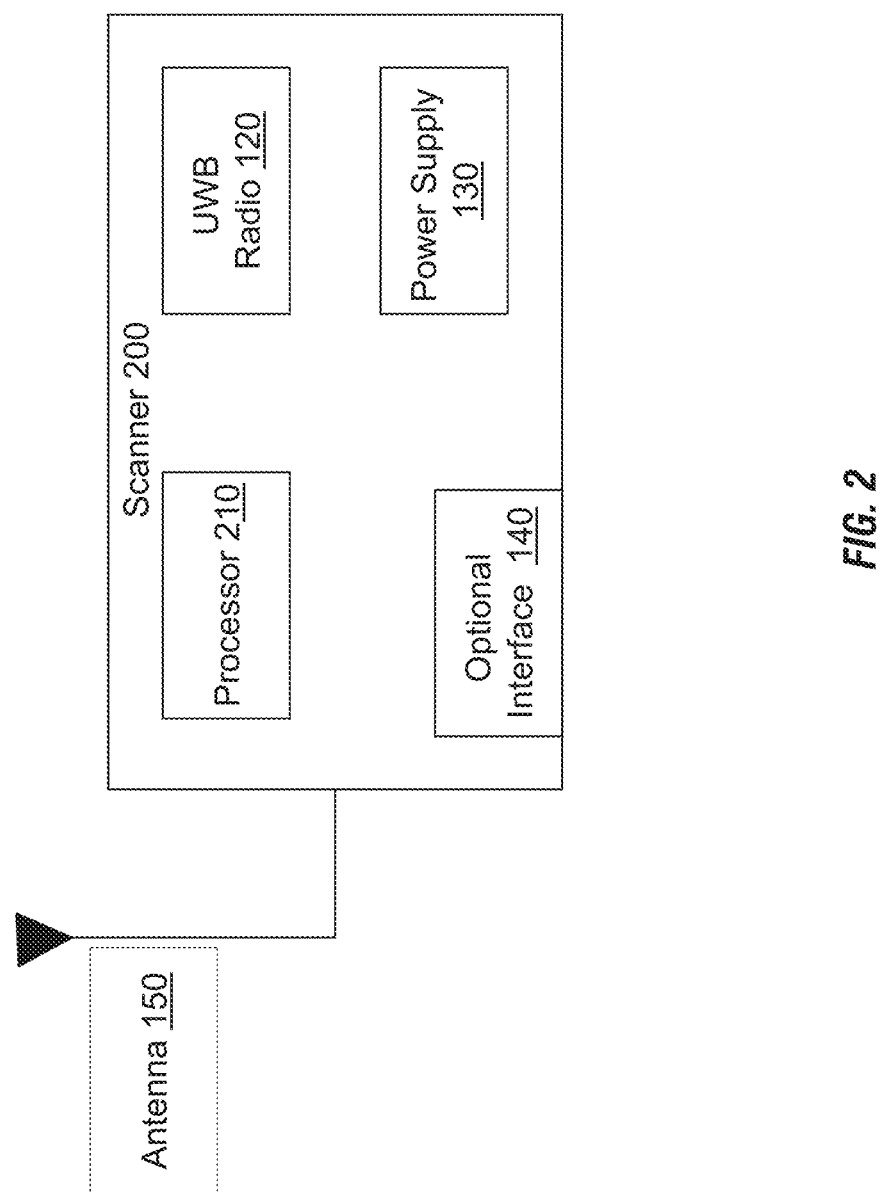
FIG. 2 is an illustration of a UWB RFID scanner.

FIG. 2 is a block diagram of the essential components of a UWB RFID scanner (reader, interrogator). The UWB RFID scanner can be constructed in a wide variety of form factors, such as, but not limited to SDCIO cards, PCMCIA cards, barcode scanner, cell phones, cell phone battery packs, PDAs, microprocessors, etc.

At a minimum, scanner 200 includes a processor 210, a UWB radio 120, a power supply 130, and antenna 150. Optionally scanner 200 can include interface 140.

The processor 210 contains RAM, and for sophisticated uses can include a computer, such as, but not limited to a PowerPC. The processor 210 integrates and controls the tags functions. Scanner 200's main communication interface is via UWB radio 120 which is connected to antenna 150. The scanner's microprocessor may be built on hardware including, but not limited to, Field Programmable Gate Arrays (FPGA), Application Specific Integrated Circuits (ASIC), System-On-A-Chip (SoC), etc.

Scanner 200's main communication interface is via UWB radio 120 which is connected to antenna 150. Radio 120 is UWB. The UWB radio 120 may be configured to operate using standards such as, but not limited to, 802.15.3a, 802.15.4a, MBOA, DSSSS, FCC Part 15 Subpart B, etc.

The power supply 130 for scanner 200 is an onboard battery. Optionally, the scanner can be powered through an electrical power cord.

The optional interface 140 may be a port such as, but not limited to an RJ-11 jack for telephone twisted pair, an RJ-45 jack for an Ethernet connection, IEEE 1394 Fire Wire connection, USB, RS-232, PCMCIA slot, SDIO connection, Compact Flash slot, etc. The PCMCIA slot can be used as a wireless integration point for systems such as, but not limited to, Bluetooth, 802.11a, 802.11b, 802.11g, GSM, UWB, etc.

Figure 3:
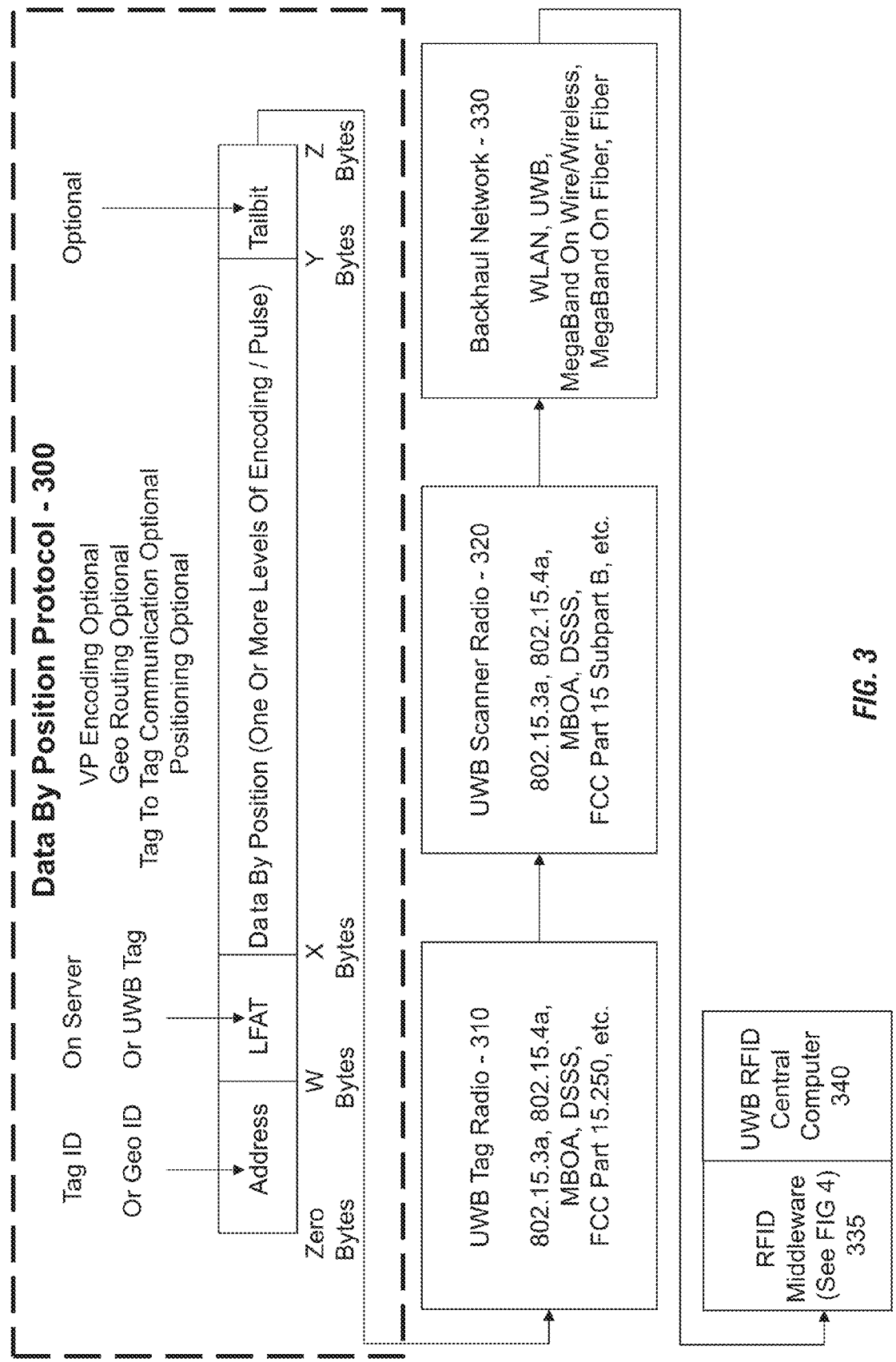
FIG. 3 is an illustration of the present invention's protocol and various options.

FIG. 3 is an illustration of the present invention's protocol, various options, and the typical flow on a UWB RFID network. The present invention's data by position protocol 300 is outlined with a dotted line. The partitioned data, or structured linear database, that is illustrated in FIG. 3 shows the Tag ID in the Address partition, which starts at Zero bytes and ends at W Bytes. The LFAT partition begins at W bytes and ends at X bytes. This partition is optional and can be used to identify the decoding template to understand the meaning of the data encoded on a specific UWB tag. Additional data by position partitions, which can include data such as, but not limited to, part number, lot number, shipping data, customer information, etc., begin at X bytes and end at Y bytes. Each sub-partition in the larger data by position partition will have their own start and stop byte designations. The tailbit partition begins at Y bytes and ends at Z bytes. The tailbit is used to identify and delineate the end of a specific data transmission.

Figure 4:
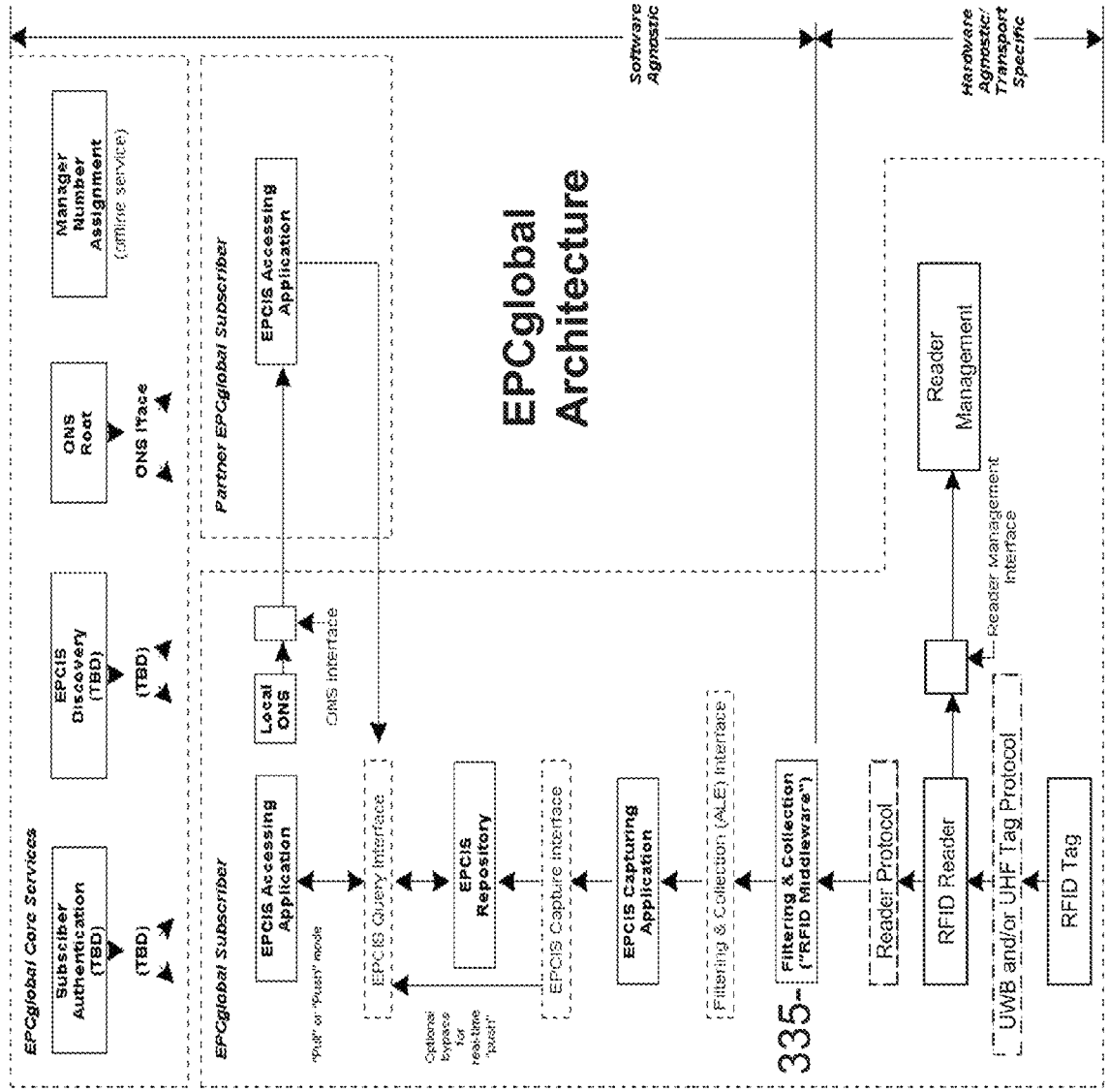
FIG. 4 illustrates how the present invention interfaces with the EPCglobal software architecture at the "RFID Middleware" interface.

This partitioned data structure can be transmitted and received by the UWB tag radio 310, the UWB scanner radio 320, and equipment in the wireless or wireline backhaul network 330 interfacing to a UWB RFID central computer 340 through RFID middleware 335 that is running EPCglobal architecture software as illustrated in FIG. 4.

The UWB tag radio 310 can operate using protocols such as, but not limited to, 802.15a, 802.15.4a, UWB MBOA, UWB DSSS, or FC Part 15.250, etc.

The UWB scanner radio can operate using protocols such as, but not limited to, 802.15a, 802.15.4a, MBOA, DSSS, or FCC Part 15 Subpart B, etc.

The UWB scanner radio 320 can also operate as an interface to a UWB pulse-based wired medium backhaul network (MegaBand) 330, or other standardized wireless, wired, or fiber optic networks.

The UWB scanner radio 320 is capable of transmitting and receiving either UWB pulse-based wired communications, non-UWB pulse-based wired or wireless communications, or variable pulse encoded fiber optic systems. Any of these systems can be running and/or encapsulating communication protocols such as, but not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4k (V.32bis), Modem 19.2k (V.32terbo), Modem 28.8k (V.34), Modem 33.6k (V.34plus/V.34bis), Modem 56k (V.90), and Modem 56k (V.92), 64k ISDN and 128k dualchannel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz), 16-pair IrDA-Control, 802.15.4 (2.4 GHz), Bluetooth 1.1, 802.11, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2, OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Skinny Client Control Protocol (Cisco), VoIP (Voice over IP) standard media protocols, such as, but not limited to, DVB Digital Video Broadcasting, H.261 Video Stream For Transport Using The Real-Time Transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security And Authentication, H.323SET, H.245 Channel Usage And Capabilities, H.450.1 Supplementary Services For H.323, H.450.2 Call Transfer Supplementary Service for H.323, H.450.3 Call Diversion Supplementary Service for H.323, H.450.4 Call Hold Supplementary Service, H.450.5 Call Park Supplementary Service, H.450.6 Call Waiting Supplementary Service, H.450.7 Message Waiting Indication Supplementary Service, H.450.8 Calling Party Name Presentation Supplementary Service, H.450.9 Completion of Calls to Busy Subscribers Supplementary Service, H.450.10 Call Offer Supplementary Service, H.450.11 Call Intrusion Supplementary Service, H.450.12 ANF-CMN Supplementary Service, RAS Management of Registration, Admission, Status, T.38 IP-based Fax Service Maps, T.125 Multipoint Communication Service Protocol (MCS), VoIP (Voice over IP) SIP suite of standard protocols, such as, but not limited to, MIME, SDP Session Description Protocol, SIP Session Initiation Protocol, phy protocols including, but not limited to, LDVS—Low Voltage Differential Signaling, LVTTL—Low Voltage Transistor—Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR, DDR, QDR, RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I²C, MDIO, JTAG, fiber optic protocols including, but not limited to, SDH, CWDM, DWDM, backplane protocols including, but not limited to, VMEbus, PC 104, ATCA, SBus, EPCglobal, GTAG, and other protocols, such as, but not limited to, GFP.

FIG. 4 illustrates how the present invention interfaces with the EPCglobal software architecture at the "RFID Middleware" interface. The EPCglobal software is designed to be agnostic. The current EPCglobal protocol describes wave-oriented UHF hardware, but the shaded portion of FIG. 4 illustrates how UWB RFID hardware can be integrated into current software solutions, and well understood data partitioning on standard UHF tags.

A general description of the present invention as well as a preferred embodiment of the resent invention has been set forth above. Those skilled in the art to which the present invention pertains will recognize and be able to practice additional variations in the methods and systems described which fall within the teachings of this invention. Accordingly, all such modifications and additions are deemed to be within the scope of the invention which is to be limited only by the claims appended hereto.

What is claimed:

1. A method for communications, comprising:
   providing an RFID tag operating with a radio signal in the 860 Mhz-960 Mhz frequency range, the RFID tag comprising a processor and a UWB radio operatively connected to the processor and an interface port operatively connected to the processor;
   receiving a data transmission transmitted using a UWB signal from the RFID tag, wherein said UWB signal is a pulse-based signal and the RFID tag is configured to transmit and receive digitally independent pulses using a UWB modulated pulse train, said RFID tag is a passive tag; and
   accessing data within the data transmission using a communications protocol wherein an initial portion of the data transmission comprises a tag identifier followed by a partition to identify a decoding template and defines a structure of the data transmission such that once decoded subsequent data in the data transmission is directly accessible without additional decoding.

2. The method of claim 1 wherein the identifier is a Linear File Allocation Table division.

3. The method of claim 2 wherein the Linear File Allocation Table division is configured to identify a particular decoding template.

4. An RFID tag operating in the 860 Mhz-960 Mhz frequency range, comprising:
   a processor;
   an interface port operatively connected to the processor;
   a UWB radio operatively connected to the processor, said UWB radio configured to send and receive a pulse-based signal such that the RFID tag is configured to transmit and receive digitally independent pulses using a UWB modulated pulse train;

wherein the RFID tag is a passive tag comprising an antenna; and wherein the processor is adapted to send data using a communications protocol wherein an initial portion of a data transmission comprises a tag identifier followed by a partition to identify a decoding template and defines a structure of the data transmission such that once decoded subsequent data in the data transmission is directly accessible without additional decoding.

5. The RFID tag of claim 4 wherein the tag identifier is a Linear File Allocation Table division.

6. The RFID tag of claim 5 wherein the Linear File Allocation Table division is configured to identify a particular decoding template.

7. An RFID tag operating in the 860 Mhz-960 Mhz frequency range, comprising:

a processor;

an interface port operatively connected to the processor;

a UWB radio operatively connected to the processor;

wherein the RFID tag is a passive tag configured to transmit and receive digitally independent pulses using a UWB modulated pulse train; and wherein the processor is adapted to send data in a structured linear database communications protocol which includes an initial portion of the data transmission comprising a tag identifier followed by a partition to identify a decoding template and which defines a structure of the data transmission such that once decoded subsequent data in the data transmission is directly accessible to a receiver without additional decoding of a subsequent portion of the data transmission containing the subsequent data.

8. The RFID tag of claim 7 wherein the passive tag comprises an antenna, said antenna configured to receive radio waves from a reader and convert the radio waves to power for the RFID tag.

9. The RFID tag of claim 7 wherein the tag identifier is a Linear File Allocation Table division.

10. The RFID tag of claim 9 wherein the Linear File Allocation Table division is configured to identify a particular decoding template.

11. The RFID tag of claim 10 wherein the data transmission further comprises the decoding template.

\* \* \* \* \*